US009239513B2

(12) United States Patent  (10) Patent No.: US 9,239,513 B2
Chien  (45) Date of Patent: Jan. 19, 2016

(54) LASER PROJECTION LIGHT

(76) Inventor: Tseng-Lu Chien, Walnut, CA (US)

( * ) Notice: Subject to any disclaimer, the term of this patent is extended or adjusted under 35 U.S.C. 154(b) by 310 days.

(21) Appl. No.: 12/938,564

(22) Filed: Nov. 3, 2010

(65) Prior Publication Data

US 2012/0105814 A1    May 3, 2012

(51) Int. Cl.
*G03B 21/20*    (2006.01)

(52) U.S. Cl.
CPC ...................................... *G03B 21/20* (2013.01)

(58) Field of Classification Search
CPC .................................. G03B 21/21; F21L 14/12
USPC .............................. 353/85, 119, 122; 362/641
See application file for complete search history.

(56) References Cited

U.S. PATENT DOCUMENTS

| | | | |
|---|---|---|---|
| 7,455,444 B2 * | 11/2008 | Chien | 362/643 |
| 2005/0151938 A1 * | 7/2005 | Onaga | 353/94 |
| 2005/0195598 A1 * | 9/2005 | Dancs et al. | 362/231 |
| 2006/0221594 A1 * | 10/2006 | Thuot Rann et al. | 362/96 |
| 2009/0002644 A1 * | 1/2009 | Christensen et al. | 353/85 |
| 2009/0175033 A1 * | 7/2009 | Chien | 362/183 |
| 2009/0175042 A1 * | 7/2009 | Chien | 362/311.02 |

* cited by examiner

*Primary Examiner* — William C Dowling
*Assistant Examiner* — Jerry Brooks
(74) *Attorney, Agent, or Firm* — Bacon & Thomas, PLLC

(57) ABSTRACT

A laser projection light has a light blocking wall and safety sensor to prevent people from directly looking into the laser beams to harm their eyes. The laser projection light may be an AC powered laser projection light or a DC powered battery operated unit, and may also incorporate a UL listed LED light device to that provides an LED light device function in addition to the projection function in case people do not want to see the laser projection light performance and wish to switch off the laser beam.

3 Claims, 4 Drawing Sheets

Fig 2-1
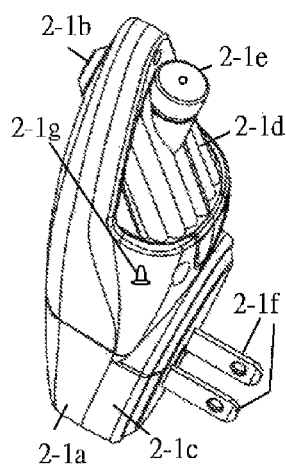
Fig 2-2
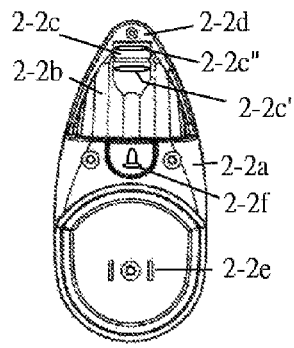
Fig 2-3
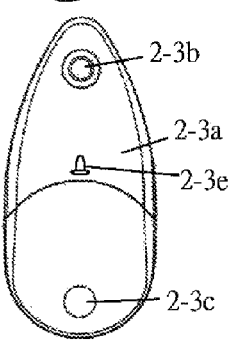
Fig 2-4
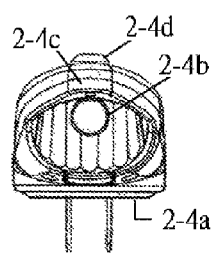
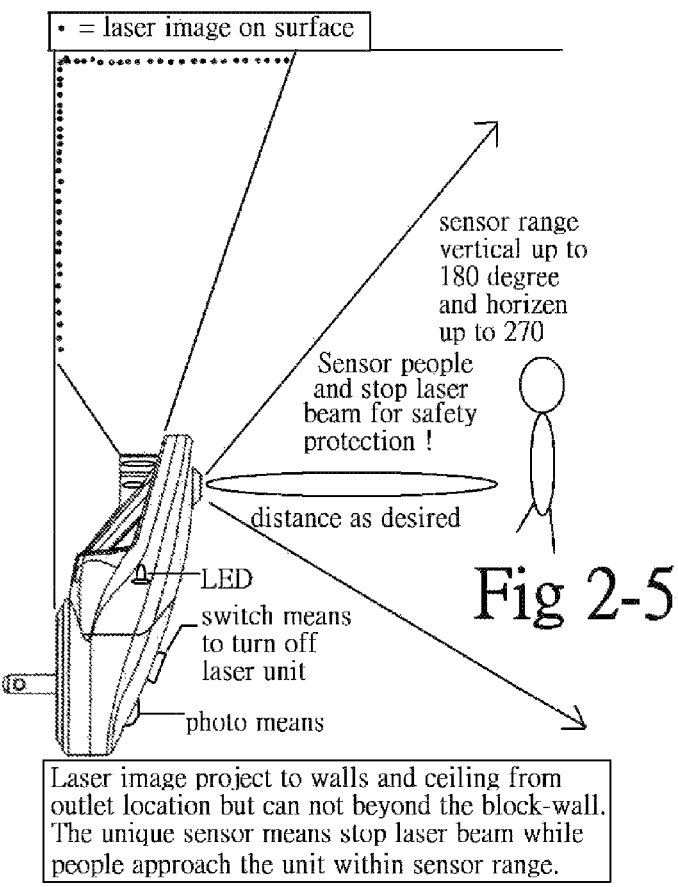
Fig 2-5
Laser image project to walls and ceiling from outlet location but can not beyond the block-wall. The unique sensor means stop laser beam while people approach the unit within sensor range.

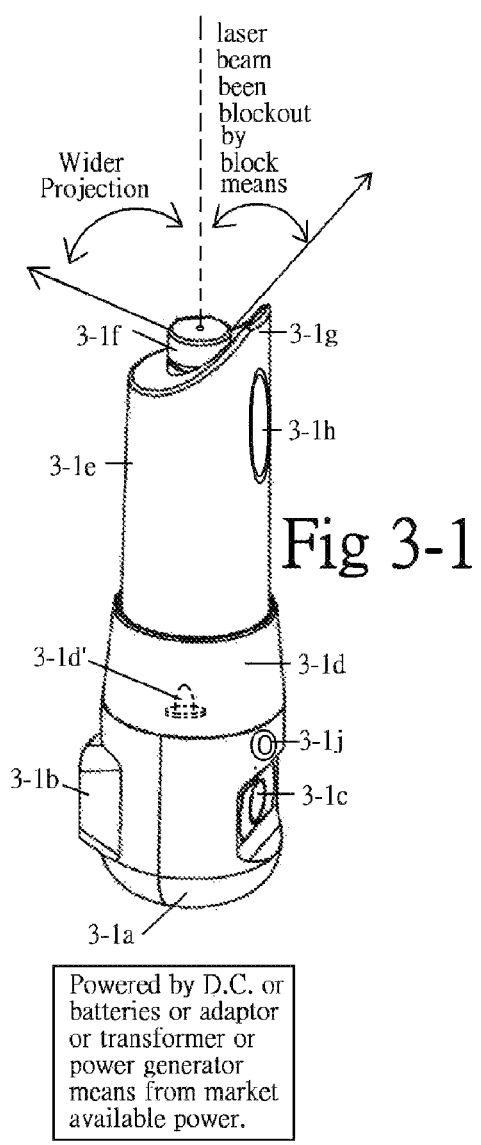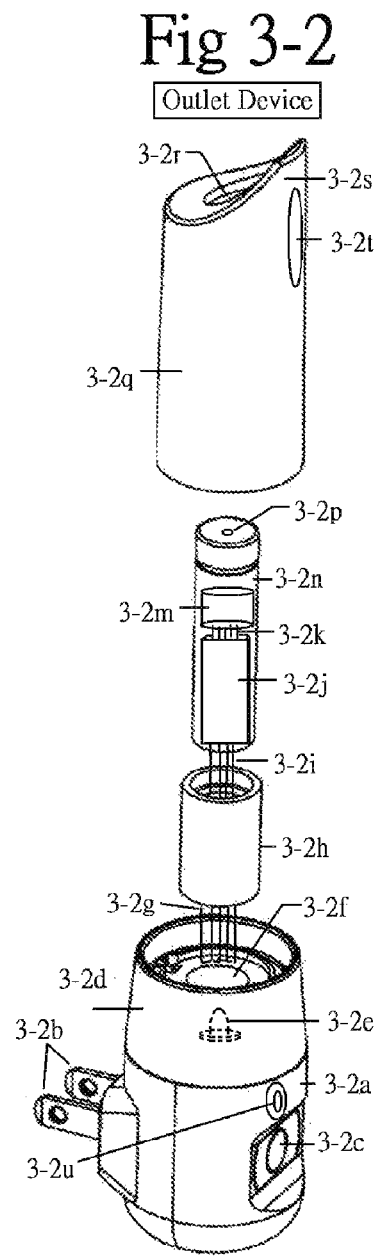

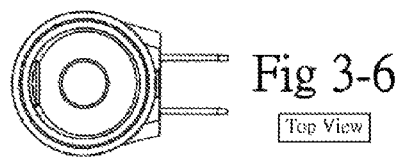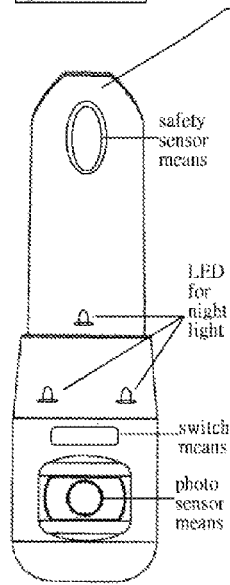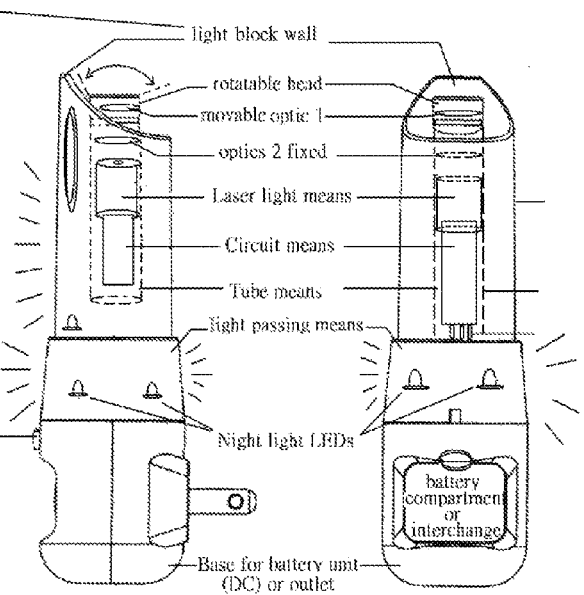

LASER PROJECTION LIGHT

BACKGROUND OF THE INVENTION

This application has subject matter in common with the inventor's prior patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11,527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156. 11/094,155. 10/954,189, 10/902,123, 10/883,719, 10/883,747, 10/341,519, 12/545,992, 12/292,580, 12/710,918, 12/622/000, 12/710,561, 12/710, 12/711,456, and 12/771,003.

The above-listed prior patent applications of the inventor apply optics theory to LED lights for outdoor or indoor application and that are powered by alternating current (AC) or direct current (DC) supplied by an electric cord and plug for an outlet, or by a battery, transformer, solar cell, or other power source to create a plurality of LED light beams and illuminate close areas, or remote areas by projection of the light beams to the remote areas. The present invention may utilize a number of principles taught in the prior applications, including the provision of more than one light source, more than one function, more than one optics means, more than one projection means, super power saving circuits, and cost saving concepts.

SUMMARY OF THE INVENTION (1) The current invention relates to a laser projection light which has a special arrangement for preventing people from directly viewing the laser light beam and causing harm to their eyes. The current invention has a light blocking wall to prevent people from directly seeing the laser light source and sensor means to detect when people are near the laser project light and automatically turn off the laser projection light. Hence, the invention totally solves the problem of harm to people's eyes caused by direct viewing of the laser light source.

(2) The current invention also relates to a laser projection light which incorporates a laser, hologram, and/or grating optics means to cause the laser light beams to make desired geometric patterns that can be seen on desired surfaces including walls and a ceiling.

(3) The current invention further relates to a laser projection light which incorporates more than one laser, hologram, and/or grating optics means to change a related position of the said laser, hologram, or grating optics means by adjustable means, motor means, or other moving means to provide a variety or plurality of continuously changing light effects, including steady, random, chasing, fade in and fade out, and any other known lighting effects.

(4) The current invention further incorporates LED light means to cause the laser projection light to have a night light function and offer illumination for an area near the laser projection light. Sometimes, people do not like laser projection on walls or ceiling or ground, so they can turn off the laser projection light and only keep the LED night light as a normal LED night light function. Because the laser and LED power source can use very similar electric signals, the LED and laser can be arranged in one unit without any special technical difficulties.

The current invention thereby provides the following advantages (1) it protects people's eyes from direct exposure to the laser light beam, (2) creates a variety, of changeable laser light performances by incorporating more than one laser, hologram, or grating optics means and/or motor means, adjustable means, or moving means to change positions of the optics means and create eye-catching effects, and (3) incorporates an LED light source to provide one unit with two different light sources to become a very practical night light and projection light.

BRIEF DESCRIPTION OF THE DRAWINGS

FIGS. 2-1, 2-2, 2-3, 2-4 show details of the preferred embodiment of FIG. 1.

FIG. 2-5 shows laser light beam performance with respect to walls and ceiling, and protection range of the sensor means.

FIGS. 3-1, 3-2, 3-3, 3-4, 3-5, and 3-6 show a second preferred embodiment with different a shape of the laser projection light and both a laser and an LED light source in one unit.

DETAILED DESCRIPTION OF THE PREFERRED EMBODIMENTS

Figure 1:
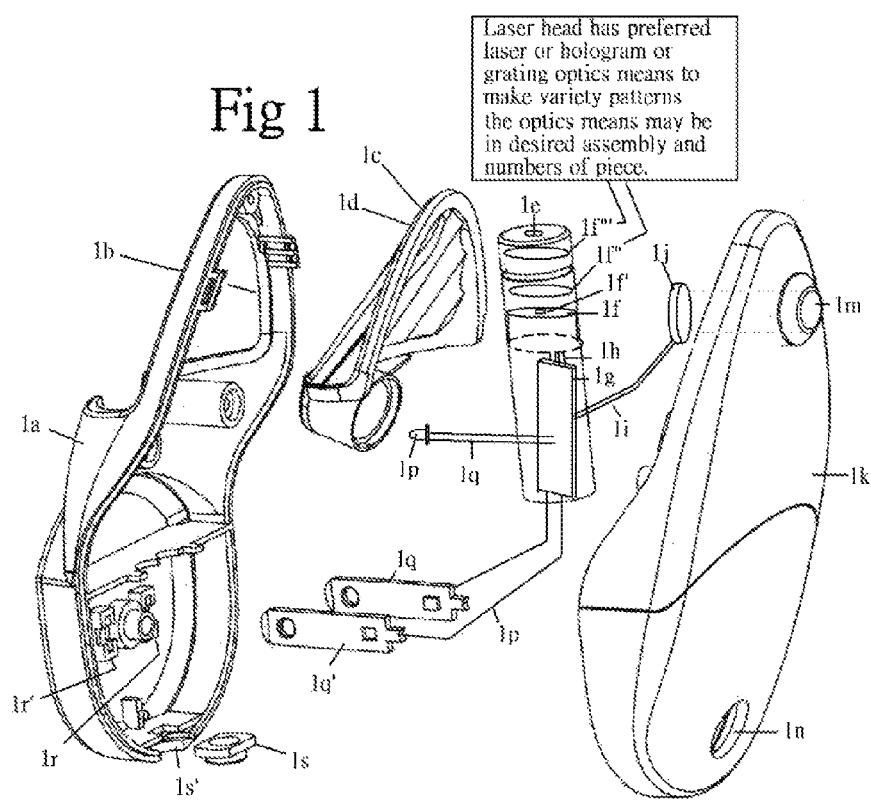
FIG. 1 is an isometric view of a first preferred embodiment of the invention. that provides additional protection.

The current invention for a safety laser projection light which has light beam blocking wall and safety sensor means to prevent people from directly looking at the laser unit's strong light beams to overcome all marketplace concerns.

The current invention also provides a combination of a laser projection light and built-in LED light source that serves as a night light to supplement the laser projection light function in case people do not want to see laser light performance, so that people can turn off the laser projection light and keep the LED night light on when plugged into an outlet, thereby adding practicality to the laser projection light.

The current invention also may apply a motor means, adjustable means, time piece parts and accessories, and/or motion means to cause the at least one laser, hologram, or grating means to change relative orientation, position, and/or distance and thereby cause the light beam patterns to change or vary for an eye-catching laser beam light performance.

As shown in FIG. 1, the laser projection light includes a laser unit (1*f*), circuitry (1*g*), prongs (1*q*)(1*q*'), and an adjustable means (1*e*) to change the relative orientation or position of the laser, a hologram, a grating, or other optics means and create changeable, variable, variety, plurality of the different laser light beams performance.

The laser unit (1*f*) faces upwardly while the prong means (1*q*)(1*q*') face a rear side of the housing facing a wall outlet and a sensor 1*j*, lens 1*m*, and blocking wall (see element 2-2*d* in FIG. 2-2) are on the front side. The laser light beams will be blocked by the blocking wall so the laser light beams can only be emitted to a certain angle from the ceiling, which angle can be designed so people cannot directly see the light beams to harm their eyes. The safety sensor means (1*j*) senses people close to the projection light and stops the laser unit from emitting laser beams to provide protection that is in addition to that provided by the blocking wall.

FIGS. 2-1, 2-2, 2-3, and 2-4 show details of the preferred embodiment of FIG. 1, including a lens (2-1*d*) (2-2*b*), front housing (2-1*a*), back housing (2-1*c*) (2-2*a*), laser unit (2-1*e*) (2-4*b*), LED (2-1*g*) (2-2*f*) (2-3*e*), prong means (2-1*f*) (2-2*c*), safety sensor means (2-1*b*) (2-3*b*), blocking wall (2-2*d*) (2-4*c*) and photo sensor means (2-1*b*, 2-2*d*, 2-3*b*).

FIG. 2-5 shows the laser light beam performance provided the laser projection unit on walls and a ceiling. It also shows the sensor means to sense people close to the laser projection light. When people fall within the sensing range, the sensor will deliver an electric signal to circuit means to turn off the laser unit and stop it from emitting laser beams. This will prevent kids or people from directly viewing the strong light beams emitted by the laser unit, which would otherwise harm the people's eyes. The sensor range can be designed as required by the market. A preferred range is one feet, covering a vertical range of 45 degrees above and below the center and a horizontal range of 90 degrees or more to the left and right of center. In the meantime, the laser projects onto the wall into which the projection light is plugged and onto the ceiling, but part of the projection area is blocked by the blocking wall FIGS. 3-1, 3-2, 3-3, 3-4, 3-5, and 3-6 show a second preferred embodiment with a different shape of the laser projection light but which still has a blocking wall (3-1g) (3-2s) extending on one side of the housing, a safety sensor means (3-1h) (3-2t), a top housing (3-1e) (3-2q), a lower housing (3-1d) (3-2d), an LED night light base with UL approval certification (3-1a) (3-2a), a built-in LED (3-1d') (3-2e) that serves as a night light, a photo sensor (3-1c) (3-2c), switch means (3-1j) (3-2u) to turn off the laser projection light by manual operation, a laser unit (3-1f) (3-2m), circuit means (3-2j), conductive means (3-2i) (3-2g), a holder (3-2h), a lens (3-1d) (3-2d), prong means (3-2b), a battery compartment (3-1b) or other electric parts and accessories to cause the laser (3-1f) (3-2m) and LED (3-1d') 93-2e) to provide two light sources in one unit. This embodiment may also include just the laser projection light without the LED. Optional added features include a hologram, laser, grating optics means and means to change the relative position and orientation of the laser unit by a motor means, adjustment means, movement means or other means to enable at least one of the optics means to change from a last position or orientation and create changeable or variable laser light effects.

As shown in FIGS. 3-1 and 3-2, the blocking wall 3-1g,3-2s extends into the wider projection area so as to block laser beams on side of the projection area. The blocking wall 3-1g, 3-2s is on the same side as the sensor 3-1h,3-2t for turning off the light device in case someone enters the sensing area. An LED 3-1d',3-2e is also provided to provide a night light function through housing part 3-1d,3-2d even when the laser unit 3-1f,3-2n is switched off by switch 3-1c,3-2c. As usual, the night light LED may be controlled by a light sensor 3-1cj,3-2u. Power may be provided by batteries, a transformer or adaptor, or, as shown in FIG. 3-2, prongs 3-2b.

The invention claimed is:

1. A laser projection light, comprising:
   a housing;
   a laser unit for projecting laser beams over a projection area that extends above and to all sides of said housing;
   at least one light blocking wall extending from only one side of said housing into a corresponding one side of said projection area to prevent laser beams from entering the projection area on said one side of said housing, wherein said light blocking wall does not extend on sides of said housing other than said one side, thereby permitting said laser beams to enter a portion of the projection area that is not on said one side while protecting eyes of a person from said laser beams on said one side; and
   safety sensor means arranged on the housing for detecting a location of a person and turning off the laser beam when the person is within a predetermined safety range of the safety sensor means, said blocking wall providing additional protection for the eyes of the person when the person is outside the predetermined safety range.

2. A laser projection light as claimed in claim 1, wherein the laser projection light includes additional parts and accessories selected from the group consisting of circuitry and conductors; prongs; a battery compartment; laser optics; hologram optics; a grating; means for adjusting the laser beam; a motor; means for moving the laser, housing, or parts and accessories; at least one lens; at least one LED; a safety certified LED base; and control means for causing the laser projection light to exhibits predetermined light performance when the laser is connected with a power source.

3. A laser projection light as claimed in claim 2, wherein the predetermined light performance is selected from the group consisting of the following lighting effects: flashing; chasing; random; rotating; fade-in/fade-out; moving; varying; color changing; color adding; geometric light pattern display; changeable dot matrix patterns; and motion picture effects.

* * * * *